United States Patent [19]
Zang

[11] Patent Number: 5,879,759
[45] Date of Patent: Mar. 9, 1999

[54] TWO-STEP METHOD FOR THE PRODUCTION OF PRESSURE SENSITIVE ADHESIVE BY RADIATION CURING

[75] Inventor: Donald H. Zang, Shrewsbury, Pa.

[73] Assignee: Adhesives Research, Inc., Glen Rock, Pa.

[21] Appl. No.: 996,275

[22] Filed: Dec. 22, 1997

[51] Int. Cl.$^6$ ....................................................... C08J 7/04
[52] U.S. Cl. ................... 427/505; 427/204.4; 427/385.5; 427/516; 427/551; 427/558; 427/559
[58] Field of Search ..................................... 427/505, 516, 427/551, 558, 559, 204.4, 385.5

[56] References Cited

U.S. PATENT DOCUMENTS

| | | |
|---|---|---|
| 4,141,806 | 2/1979 | Keggenhoff et al. . |
| 4,181,752 | 1/1980 | Martens et al. . |
| 4,379,201 | 4/1983 | Heilmann et al. . |
| 4,421,822 | 12/1983 | Levens . |
| 4,513,039 | 4/1985 | Esmay . |
| 4,522,870 | 6/1985 | Esmay . |
| 4,587,313 | 5/1986 | Ohta et al. . |
| 4,665,106 | 5/1987 | Ohta et al. . |
| 4,737,559 | 4/1988 | Kellen et al. . |
| 5,183,833 | 2/1993 | Fisher et al. . |
| 5,302,629 | 4/1994 | Berejka . |
| 5,462,977 | 10/1995 | Yoshikawa et al. . |
| 5,536,759 | 7/1996 | Ramharack et al. . |
| 5,552,451 | 9/1996 | Everaerts et al. . |
| 5,618,899 | 4/1997 | Appelt et al. . |
| 5,683,798 | 11/1997 | Bennett et al. . |

FOREIGN PATENT DOCUMENTS

96/04346  2/1996  WIPO .

*Primary Examiner*—Bernard Pianalto

[57] ABSTRACT

A two-step method is provided for the production of a pressure sensitive adhesive by radiation curing. The method comprises the steps of initially irradiating a monomer composition comprised of 65 to 100 percent by weight of monomers having a Tg<0° C. to form a coatable syrup, followed by adding at least one monomer having a Tg>0° C. and at least one multifunctional monomer or oligomer to said syrup, and further irradiating the mixture to form a pressure sensitive adhesive.

12 Claims, No Drawings

TWO-STEP METHOD FOR THE PRODUCTION OF PRESSURE SENSITIVE ADHESIVE BY RADIATION CURING

BACKGROUND OF THE PRESENT INVENTION

The present invention is directed to a two-step method for the production of a pressure sensitive adhesive by radiation curing.

It is well known that pressure sensitive adhesives may be prepared by radiation curing of monomer admixtures. See, for example, U.S. Pat. Nos. 4,181,752; 4,379,201; 4,421,822; 4,513,039; 4,522,870; 4,587,313; 4,665,106; 5,183,833; 4,737,559; 5,302,629; 5,462,977; 5,536,759; 5,552,451; 5,618,899 and 5,683,798. Indeed, attempts have been made to provide reinforced pressure sensitive adhesives by incorporating reinforcing macromers in the radiation curable composition. See, for example, PCT/US97/09601 and WO94/13750.

It is, however, desirable to provide a method for the production of a macromer-free pressure sensitive adhesive by radiation curing which does not require the presence of a reinforcing macromer to yield a pressure sensitive adhesive exhibiting desirable adhesive properties.

OBJECTS AND SUMMARY OF THE PRESENT INVENTION

It is accordingly an object of the present invention to provide an improved method for the production of a pressure sensitive adhesive by radiation curing.

It is further an object of the present invention to provide a method for the production of a macromer-free pressure sensitive adhesive by radiation curing.

In accordance with the present invention, there is thus provided a method for the production of a macromer-free pressure sensitive adhesive comprising the steps of:

(1) providing a macromer and solvent-free radiation-curable composition comprised of at least one A monomer consisting of a (meth)acrylic acid ester of a non-tertiary alcohol having from 4–12 carbon atoms on average and, optionally, at least one B monomer different from said A monomer, said A monomer being present in said composition in an amount of at least 60 percent by weight and said composition comprised of from 65 to 100 percent by weight of monomers having a $Tg<0°$ C.;

(2) irradiating said composition to partially polymerize said monomer mixture whereby a coatable syrup is formed;

(3) combining with the syrup formed in step (2), in the absence of a macromer and less than 20 percent by weight of a monomer having a $Tg<0°$ C., at least one C monomer having a $Tg>0°$ C. and at least one multifunctional monomer or oligomer D to form a modified syrup, the weight ratio of said components C and D to said composition of step (1) ranging from about 20:80 to 5:95; and (4) irradiating said modified syrup to an extent sufficient to provide a copolymer having pressure sensitive adhesive properties.

DETAILED DESCRIPTION OF THE PRESENT INVENTION

The method of the present invention includes an initial step whereby low Tg monomers are irradiated to form a syrup, followed by further irradiating the syrup in admixture with a high Tg multifunctional monomer or oligomer to form a pressure sensitive adhesive.

The low Tg ($Tg<0°$ C.) monomers of the first step of the present invention comprise (meth)acrylic acid esters of non-tertiary alcohols having from 4–12 carbon atoms on average, optionally in association with at least one B monomer different from said A monomer which is copolymerizable with monomer A.

Exemplary A monomers include but are not limited to esters of (meth)acrylic acid with non-tertiary alcohols such as 1-butanol, 1-pentanol, 2-pentanol, 3-pentanol, 2-methyl-1-butanol, 1-methyl-1-pentanol, 2-methyl-1-pentanol, 3-methyl-1-pentanol, 2-ethyl-1-butanol, 3,5,5-trimethyl-1-hexanol, 3-heptanol, 2-octanol, 1-decanol, 1-dodecanol, etc. Such monomers are known to those skilled in the art.

Optional B monomers include but are not limited to one or more (meth)acrylic acid, itaconic acid, (meth)acrylamide, (meth)acrylonitrile, diacetone acrylamide, and 2-carboxy ethyl esters of acrylic acid.

The radiation-curable composition used to form the syrup in the first irradiation step is comprised primarily of monomers having a $Tg<0°$ C. However, minor amounts of monomers having a $Tg>0°$ C. may be present. Generally, the composition of step (1) comprises from 65 to 100 percent by weight of monomers having a $Tg<0°$ C.

Once formed, the composition is subjected to partial radiation curing in the first irradiation step to an extent sufficient to form a coatable syrup. In the present invention the term "radiation" means light rays, such as ultraviolet rays, or ionizing radiation such as an electron beam. Preferably, ultraviolet lamps are used which emit UV light in the wavelength range absorbed by the particular photoinitiator used. Several different lamps which are commercially available may be used. These include medium pressure mercury lamps and low intensity fluorescent lamps, each having various emission spectra and emission maxima between 280 and 400 nanometers. Commercially available fluorescent black lights with a maxima at 351 nanometers and 90% of the emissions between 300 and 400 nanometers (nm) may be utilized. In general, the total radiation dose should be between about 400–600 milliJoules/cm$^2$. It is preferable that at least about 75 percent of the radiation be between 300 and 400 nm.

If the composition is to be cured by exposure to nonionizing radiation, such as ultraviolet radiation, then a photoinitiator is also present in the composition. The photoinitiator, if present, is employed at a concentration of from about 0.1 to 10 weight percent, preferably from 0.5 to 5 weight percent based on the total weight of the radiation curable pressure sensitive adhesive composition.

The photoinitiators which may be used are well known to those skilled in the art. Such photoinitiators include but are not limited to 2,2-diethoxyacetophenone, 2,2-dimethoxyphenoxyacetophenone, 2- or 3- or 4-bromoacetophenone, 3- or 4-allylacetophenone, 2-acetonaphthone, benzaldehyde, benzoin, the allyl benzoin ethers, benzophenone, benzoquinone, 1-chloroanthraquinone, Michler's Ketone, p-methoxybenzophenone, dibenzosuberone, 4,4-dichlorobenzophenone, 1,3-diphenyl-2-propanone, fluorenone, 1,4-naphthyl-phenylketone, 2,3-pentanedione, propiophenone, chlorothioxanthone, 2-methylthioxanthone xanthone or mixtures thereof.

The partially-cured coatable syrup resulting from the first irradiation step is subsequently admixed with at least one C monomer having a Tg>0° C. together with at least one multifunctional monomer or oligomer to yield a modified syrup. The modified syrup is radiation cured to provide a pressure sensitive adhesive. No macromeric compounds are added to the syrup prior to the second irradiation step. A monomer(s) having a Tg<0° C. may be added to the syrup to serve as a diluent but is added in an amount less than 20 percent by weight, based on the total weight of the syrup and components added to the syrup. Additional photoinitiator(s) may be added to the syrup to facilitate further polymerization/cross-linking. A functionalized photoinitiator such as acrylated benzophenones may be added to the syrup to enhance crosslinking. In general, the amount of monomers in the syrup is greater than the amount of components C and D in order to ensure pressure sensitive adhesive properties.

Exemplary C monomers include vinyl monomers having at least one nitrogen atom. Such monomers (each of which exhibit a $T_g$ of >0° C.) include but are not limited to N-mono-substituted acrylamides such as acrylamide, methacrylamide, N-methylacrylamide, N-ethylacrylamide, N-methylolacrylamide, N-hydroxyethylacrylamide, and diacetone acrylamide; N,N-disubstituted acrylamides such as N,N-dimethylacrylamide, N,N-diethylacrylamide, N-ethyl-N-aminoethyl acrylamide, N-ethyl-N-hydroxyethylacrylamide, N,N-dimethylolacrylamide, and N,N-dihydroxyethylacrylamide, etc.

Other C monomers include, for example, various vinyl monomers such as acrylic and methacrylic acid, methoxyethyl acrylate or methacrylate, ethyoxyethyl acrylate or methacrylate, methyl acrylate or methacrylate, ethyl acrylate or methacrylate, propyl acrylate or methacrylate, 2,2 (ethoxyethoxy) ethyl acrylate, glycerol acrylate or methacrylate, hydroxyethyl methacrylate, hydroxypropyl methacrylate, vinyl pyrrolidone and vinyl caprolactam (each of which also exhibit a $T_g$ of >0° C.).

A variety of multifunctional D monomers or oligomers may be employed. An exemplary urethane oligomer may be obtained, for example, by reacting terminal isocyanate urethane prepolymers obtained by the reaction of polyester or polyether type polyol compounds, with polyvalent isocyanate compounds. For example, compounds such as 2,4-toluene diisocyanate, 2,6-toluene diisocyanate, 1,4-xylylene diisocyanate, and diphenylmethane 4,4'-diisocyanate may be reacted with 2-hydroxyethyl (meth)acrylate, 2-hydroxypropyl (meth)acrylate, polyethylene glycol (meth) acrylate, etc. Preferably, the molecular weight of the urethane oligomer is at least 3000, and preferably within the range of from about 3,000 to 10,000.

A preferred urethane oligomer is a difunctional aliphatic urethane acrylate oligomer available commercially from Sartomer Company, Inc. of Exton, Pa. under the trade designation CN 966 H90.

Additional oligomers which may be employed include but are not limited to polyester acrylates, epoxy acrylates, silicone acrylates and unsaturated polyesters.

Exemplary multifunctional monomers include but are not limited to ethylenically unsaturated difunctional monomers such as diacrylate compounds, including 1,6-diacrylate, 1,4-butanediol diacrylate, ethylene glycol diacrylate, diethylene glycol diacrylate, tetraethylene glycol diacrylate, tripropylene glycol diacrylate, neopntyl glycol diacrylate, 1,4-butanediol dimethyacrylate, poly(butanediol)diacrylate, tetraethylene glycol dimethacrylate, 1,3-butylene glycol diacrylate, triethylene glycol diacrylate, triisopropylene glycol diacrylate, polyethylene glycol diacrylate, and bisphenol A dimethylacrylate.

Exemplary trifunctional C monomers include but are not limited to trimethylolpropane triacrylate, trimethylolpropane triamethcrylate, pentaerythritol monohydroxy triacrylate, and trimethylolpropane triethoxy triacrylate. Exemplary tetrafunctional C monomers include but are not limited to pentaerythritol tetraacrylate and di-trimethylolpropane tetraacrylate.

The syrup may be radiation cured upon being conventionally coated on a suitable backing layer. Such curing serves both to crosslink the partially-cured monomers in the syrup as well as to provide cohesive strength to the final composition due to the presence of the high Tg material. Preferably, the curing of the second irradiation step occurs in an oxygen-free atmosphere, such as a nitrogen atmosphere.

Any polymeric film may be usable as the backing film and need not be permeable or transparent to ultraviolet light. Exemplary polymeric films include polyvinyl chloride, vinyl chloride-vinylidene chloride copolymer, vinyl chloride-vinyl acetate copolymer, vinyl chloride-acrylic acid copolymer, polyvinylidene chloride, polyolefins such as polyethylene or polypropylene, polymethyl methacrylate, polyvinyl alcohol, polyamide, polyimide, polyamideimide, polyesters such as polyethylene terephthalate, polycarbonate, polyurethane and cellulose acetate.

The backing film desirably has a thickness on the order of 10 to 1000 $\mu$m. Although there is no particular limit to the thickness of the radiation-curable copolymer on the substrate, the thickness of the copolymer is generally 2 to 200 $\mu$m.

The present invention is further described in the following example which is merely illustrative of the present invention and not intended to be limiting thereof.

EXAMPLE

An initial polymerization mixture was formed comprised of the following components:

| | |
|---|---|
| Isooctyl acrylate (Monomer A) | 8.7 pbw |
| Ethoxylated nonyl phenol acrylate (B monomer) | 0.5 pbw |
| Ethyl acrylate (B monomer) | 0.9 pbw |
| Acrylic acid (C monomer) | 0.5 pbw |
| Irgacure 184 | 0.1 pbw |

The above mixture was partially cured by subjecting the mixture to a 20 watt black light bulb by conventional means to increase the viscosity of the mixture to that of a coatable syrup.

To the resulting syrup is then added the following components:

| | |
|---|---|
| N-vinyl pyrrolidone (C monomer) | 2.00 pbw |
| Diacetone acrylamide (C monomer) | 0.80 pbw |
| 1,6-hexanediol diacrylate (D monomer) | 0.04 pbw |

The resulting composition was coated on a siliconized polyester liner and covered with another polyester liner (to avoid contact with oxygen). The covered layer was then subjected to UV light for a period of time sufficient to yield a pressure sensitive adhesive exhibiting acceptable values of high tack and good shear.

What is claimed is:

1. A method for the production of a pressure sensitive adhesive comprising the steps of:

(1) providing a macromer and solvent-free radiation-curable composition comprised of at least one A monomer consisting of a (meth)acrylic acid ester of a non-tertiary alcohol having from 4–12 carbon atoms on average and, optionally, at least one B monomer different from and copolymerizable with the A monomer, said A monomer being present in said composition in an amount of at least 60 percent by weight, said composition comprised of from 65 to 100 percent by weight of monomers having a Tg<0° C.;

(2) irradiating said composition to partially polymerize said monomer mixture whereby a coatable syrup is formed;

(3) combining with the syrup formed in step (2), in the absence of a macromer and less than 20 percent by weight of a monomer having a Tg<0° C., at least one C monomer having a Tg>0° C. and at least one multifunctional D monomer or oligomer to form a modified syrup, the weight ratio of said components C and D to said composition of step (1) ranging from about 20:80 to 5:95; and (4) irradiating said modified syrup to an extent sufficient to provide a copolymer having pressure sensitive adhesive properties.

2. The method of claim 1 wherein said A monomer is an ester of (meth)acrylic acid with a non-tertiary alcohol selected from the group consisting of 1-butanol, 1-pentanol, 2-pentanol, 3-pentanol, 2-methyl-1-butanol, 1-methyl-1-pentanol, 2-methyl-1-pentanol, 3-methyl-1-pentanol, 2-ethyl-1-butanol, 3,5,5-trimethyl-1-hexanol, 3-heptanol, 2-octanol, 1-decanol and 1-dodecanol.

3. The method of claim 1 wherein said B monomer is selected from the group consisting of (meth)acrylic acid, itaconic acid, (meth)acrylamide, (meth)acrylonitrile, diacetone acrylamide and 2-carboxy ethyl esters of acrylic acid.

4. The method of claim 1 wherein said C monomer is selected from the group consisting of (meth)acrylic acid, methoxy (meth)acrylate, ethyoxyethyl (meth)acrylate, methyl (meth)acrylate, ethyl (meth)acrylate, propyl (meth)acrylate, 2,2(ethoxyethoxy) ethyl acrylate, glycerol (meth)acrylate, hydroxyethyl methacrylate, hydroxypropyl methacrylate, vinyl pyrrolidone and vinyl caprolactam.

5. The method of claim 1 wherein said multi-functional oligomer is a urethane oligomer.

6. The method of claim 1 wherein said multi-functional oligomer is selected from the group consisting of difunctional aliphatic urethane acrylate oligomers, polyester acrylates, epoxy acrylates, silicone acrylates and unsaturated polyesters.

7. The method of claim 1 wherein said multifunctional monomer is a difunctional monomer selected from the group consisting of 1,6-diacrylate, 1,4-butanediol diacrylate, ethylene glycol diacrylate, diethylene glycol diacrylate, tetraethylene glycol diacrylate, tripropylene glycol diacrylate, neopntyl glycol diacrylate, 1,4-butanediol dimethyacrylate, poly(butanediol)diacrylate, tetraethylene glycol dimethacrylate, 1,3-butylene glycol diacrylate, triethylene glycol diacrylate, triisopropylene glycol diacrylate, polyethylene glycol diacrylate, and bisphenol A dimethylacrylate.

8. The method of claim 1 wherein said multifunctional monomer is a trifunctional monomer selected from the group consisting of trimethylolpropane triacrylate, trimethylolpropane triamethcrylate, pentaerythritol monohydroxy triacrylate, and trimethylolpropane triethoxy triacrylate.

9. The method of claim 1 wherein said multifunctional monomer is a tetrafunctional monomer selected from the group consisting of pentaerythritol tetraacrylate and di-trimethylolpropane tetraacrylate.

10. The method of claim 1 wherein said C monomer is a vinyl monomer having at least one nitrogen atom.

11. The method of claim 10 wherein said vinyl monomer having at least one nitrogen atom is selected from the group consisting of (meth)acrylamide, N-methylacrylamide, N-ethylacrylamide, N-methylolacrylamide, N-hydroxyethylacrylamide, and diacetone acrylamide.

12. The method of claim 10 wherein said vinyl monomer having at least one nitrogen atom is selected from the group consisting of N,N-dimethylacrylamide, N,N-diethylacrylamide, N-ethyl-N-aminoethyl acrylamide, N-ethyl-N-hydroxyethylacrylamide, N,N-dimethylolacrylamide, and N,N-dihydroxyethylacrylamide.

* * * * *